(12) United States Patent
Tesler et al.

(10) Patent No.: US 8,438,084 B1
(45) Date of Patent: May 7, 2013

(54) METHOD AND SYSTEM FOR INVENTORY VERIFICATION

(75) Inventors: Lawrence Tesler, Seattle, WA (US); Udi Manber, Palo Alto, CA (US); Hilliard B Siegel, Seattle, WA (US); Charles Gordon, Seattle, WA (US); Varun Narang, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 3300 days.

(21) Appl. No.: 10/864,291

(22) Filed: Jun. 9, 2004

(51) Int. Cl.
*A01K 5/02* (2006.01)
*G06F 13/38* (2006.01)

(52) U.S. Cl.
USPC .......................................... 705/29; 705/217

(58) Field of Classification Search ............... 705/29
See application file for complete search history.

(56) References Cited

U.S. PATENT DOCUMENTS

| | | | |
|---|---|---|---|
| 5,963,134 A | 10/1999 | Bowers et al. | |
| 5,970,471 A | 10/1999 | Hill | |
| 6,154,771 A * | 11/2000 | Rangan et al. | 709/217 |
| 6,273,338 B1 * | 8/2001 | White | 235/462.42 |
| 6,541,100 B1 | 4/2003 | Williams et al. | |
| 6,566,024 B1 | 5/2003 | Bourdelais et al. | |
| 2002/0194051 A1 | 12/2002 | Hall | |
| 2003/0004816 A1 * | 1/2003 | Byers et al. | 705/26 |
| 2003/0009392 A1 * | 1/2003 | Perkowski | 705/26 |

OTHER PUBLICATIONS

"Book Collector Book Inventory Software," Collectorz.com Book Collector, n.d., <http://www.collectorz.com/book/book_inventory.php?from =google&keyword=book_inv . . . > [retrieved Dec. 31, 2003].
"Book Collector Features," Collectorz.com Book Collector, n.d., <http://www.collectorz.com/book/features.php> [retrieved Dec. 31, 2003].
"Edge, Junction and Corner Detection Using Color Distributions," *ACM Portal*, ACM, Inc. © 2004, <http://portal.acm.org/citation.cfm?id=505477&dl=ACM&coll=portal> [retrieved Feb. 24, 2004].
"Technology and Services," Advanced Records Management Services, Inc., n.d., <http://www.armsrecords.com/pg4.html> [retrieved Dec. 31, 2003].
"Visual Inventory Control Software," Dynamic Control Software, n.d. <http://www.dynamiccontrolsoftware.com> [retrieved Dec. 31, 2003].
Feder, A., "A Look at Delicious Library 3.0 (images)," *Think Secret*, Aug. 3, 2004, <http://thinksecret.com/news/deliciouslibrary.html> [retrieved Jan. 19, 2005].

(Continued)

*Primary Examiner* — Garcia Ade
(74) *Attorney, Agent, or Firm* — Robert C. Kowert; Meyertons, Hood, Kivlin, Kowert & Goetzel, P.C.

(57) ABSTRACT

Verification of an inventory of stored products may be achieved by obtaining an image of the stored products and using text, optical character, and other feature recognition techniques to determine product identification and storage location. A comparison between earlier and current images of the same storage location is used to identify which locations have changed, i.e., from which locations have products been moved, removed, or added. The earlier and current images of the changed locations may be displayed to a user to visually inspect the differences between the images and verify the changes in inventory represented by those differences.

16 Claims, 11 Drawing Sheets

OTHER PUBLICATIONS

"A Look at Delicious Library 3.0 Overview," *Think Secret*, Aug. 3, 2004, <http://thinksecret.com/archives/images/deliciouslibrary/Overview.html> [retrieved Jan. 19, 2005].

"Visual Inventory Control," *Dynamic Control Software*, <http://dynamiccontrolsoftware.com>, publicly available prior to Jun. 9, 2004, [retrieved Jan. 19, 2005].

* cited by examiner

METHOD AND SYSTEM FOR INVENTORY VERIFICATION

FIELD OF THE INVENTION

The present invention is directed to methods and systems for inventory control of products.

BACKGROUND OF THE INVENTION

The information age has produced an explosion of products for people to enjoy, whether that product is a book, a video or audiocassette, a CD, or DVD, audio and video devices, toys, games, apparel, and accessories. As with other kinds of products manufactured, stored, sold, and enjoyed in large volumes, taking and maintaining an inventory is challenging for both the retailers that market the products as well as the consumers who buy them.

Inventory control systems for products are known in the art. For example, one of the most common ways inventories are maintained for media and other types of products is using barcode scanners. Barcode scanner systems are primarily designed for manufacturers, retailers, and libraries, and entail the use of a barcode that is affixed to the product, after which the product is scanned when it is stocked or returned to circulation and when it is sold or borrowed.

One of the problems with the bar code inventory control systems is that they require manual handling of each product, either when the barcode is affixed to the product, or when it is subsequently scanned. Moreover, once stored, the bar code may not be easily accessible, and the product may again require manual handling. In addition, with conventional inventory systems, a storage bin whose content is unchanged still must be monitored, i.e. the product's bar code must be re-scanned only to find out that there has been no change. This is tedious and labor-intensive work that must be periodically repeated, and represents a significant portion of the cost of maintaining an inventory.

SUMMARY OF THE INVENTION

To address the above-described and other shortcomings in the prior art, the present invention provides a system and method for taking and/or verifying an inventory of stored products. The products may be any type of product that is typically stored in a manner that reveals a side of the product or the product packaging that contains product identification information, such as books or CDs that are stored vertically or horizontally in a bin or shelf to reveal the book spine or the title edge of the CD case, or any other type of product, with or without product packaging, which can be identified. The product identification information may include various distinguishing attributes of the product or the product's packaging. The attributes may include text, e.g., author, performer, title, publisher, ISBN number, etc., graphics, e.g. cover artwork, logo, typeface, etc., and/or physical characteristics, e.g., product dimensions, shape, color, reflectivity, etc., with or without packaging, however the product is stored.

In one aspect, the present invention provides a method for receiving a photographic image of one or more stored products, where the image captures the product identification information revealed on one or more sides of the product as well as the storage location. The storage location may be a stow bin in a warehouse, a retail shelf at a media store, or even a home bookshelf or other type of media storage unit. The image preferably captures the product identification in a manner such that the orientation of the product identification is accessible to a user, such as where the text attributes are oriented horizontally for easy reading.

In another aspect, the present invention provides a method for verifying the accuracy of an inventory of stored products. Using the received photographic images of the stored products, the method determines when an image is different from an earlier image of the same product storage location, e.g., when products have been added to or removed from the bins or shelves depicted in the image. The storage location is flagged, and the current and earlier images are displayed to an inventory control clerk for visual inspection and verification of any changes to the inventory represented by the differences between the images. Verification input is received from the clerk, and change transactions are automatically generated to update the inventory accordingly. In addition, the current image replaces the earlier image in preparation for the next inventory cycle, i.e., receiving the next round of photographic images of stored products.

In yet another aspect, the present invention provides a method for recognizing the product identification revealed on one or more sides of the product as captured in the photographic image, and for further recognizing the location of each recognized product. Recognizing the product identification and location may be achieved through the heuristic application of one or more recognition techniques to the image in an effort to resolve ambiguities and improve the reliability of the recognition without having to resort to manual efforts to determine what products are stored on a particular shelf or location. The recognition techniques include the application of text recognition or other optical character or feature recognition techniques to the attributes contained in the product identification information, e.g., the product's text, graphics, and/or other physical characteristics.

In one other aspect, since more than one product may be stored in a location, in one embodiment the method for recognizing the product identification may employ various pattern recognition techniques known in the art, such as edge detection, to first isolate a portion of the photographic image before attempting to recognize the product identification, where the isolated portion of the image is of a single product stored in the location. In addition, the method for recognizing the product identification may rotate the image in different orientations prior to the application of the recognition technique so as to maximize the chances of recognizing products stored in different orientations, e.g., horizontal, vertical, or somewhere in between.

In a further aspect, recognition of the product identification may be achieved through comparison to a reference image of the product. This is particularly useful when the received photographic image, or isolated portion of the image, carries insufficient detail for proper recognition or is otherwise deficient, such as when the storage location is in partial shadow, improperly lighted, or where the stored products are worn or used such that the appearance of the distinguishing attributes comprising the product's identification information has deteriorated.

In one aspect, the reference image preferably includes a complete reference identification of a product, such as an image of a book spine complete with title and author, and in some cases may be obtained from a photographic image or digital scan of the product carried out especially for that purpose when the item is initially unboxed and added to inventory. The reference image may be further inferred from an image of the product that includes that portion of the image that is to be used as the reference image, such as when the reference image is an image of the spine of a book that has been inferred from one or more images of the book's front and back covers.

In another aspect, the method for recognizing the product identification revealed on one or more sides of the product as captured in the photographic image may rely on a previous recognition of that product, i.e., the method is self-learning. For example, the reference image may be obtained from previously-received photographic images of the product from which accurate recognition was achieved. Comparison to such a reference image may increase the reliability of recognition when receiving subsequent photographic images that include the product in question.

In a still further aspect, after exhausting attempts to recognize products directly from the photographic image, recognition may be achieved through display of the image to a user and prompting the user to resolve any remaining ambiguities in recognizing the identification of the product by entering the product identification information, such as author, title, etc., as necessary. The entered product identification information is associated with the received photographic image of the product, thereby further increasing the chances of accurate recognition when receiving subsequent photographic images that include the product in question.

In yet another aspect, the present invention provides a method for a user to determine whether a particular product is present in the user's inventory as well as the storage location of the product. In one aspect, the method communicates the presence and location of the product by displaying to the user the photographic image in which the stored product was captured together with a visual indication of the storage location of the product, such as an arrow overlaying the image and pointing to the product in question.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
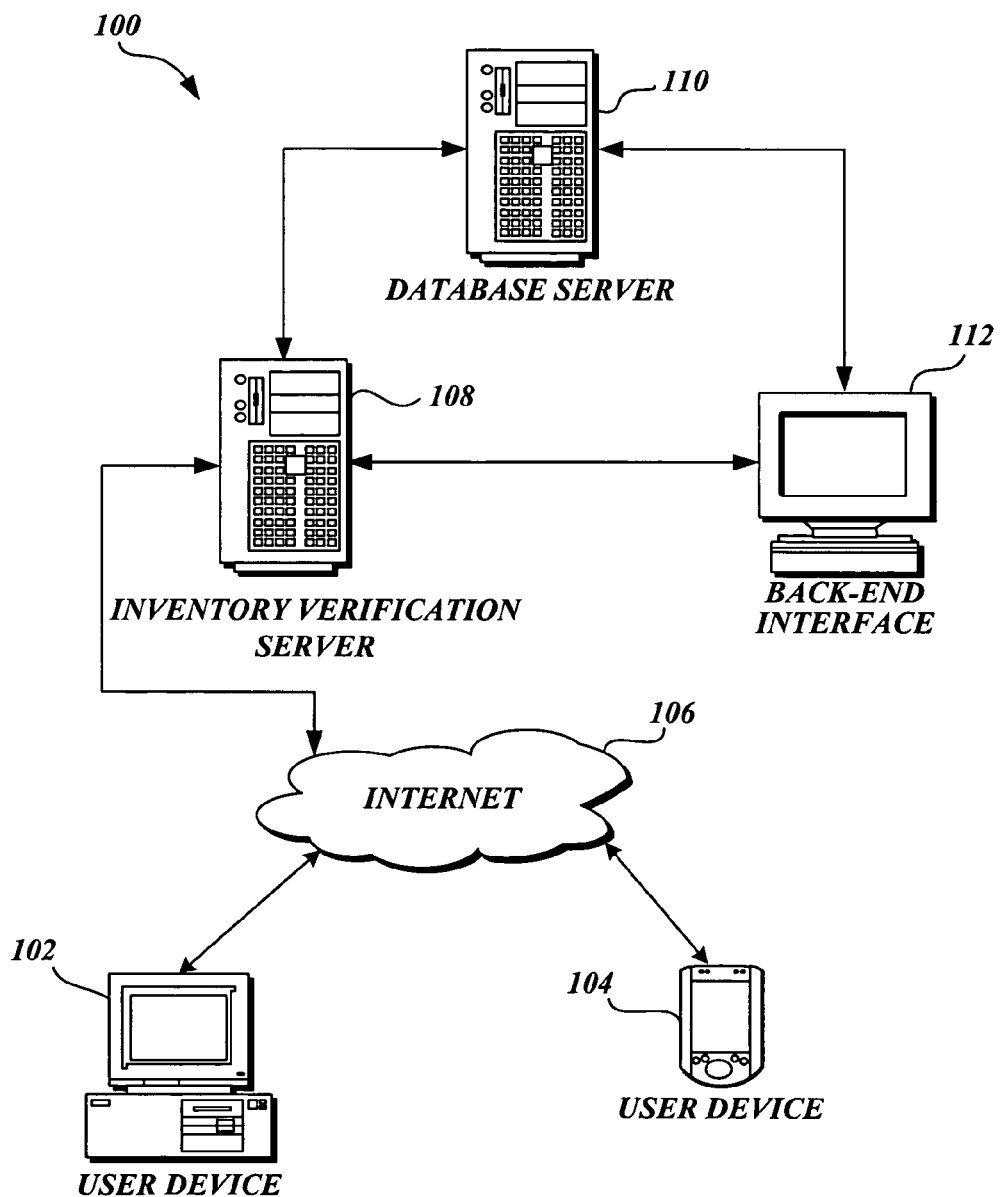
FIG. 1 is a pictorial diagram showing an environment for implementing one exemplary embodiment of the invention.

FIG. 1 illustrates one environment for implementing an embodiment of the present invention. The environment shown includes a inventory verification system 100 with database and verification servers that use images of stored products to facilitate taking and verifying an inventory of the products. The environment also includes various electronic user devices, such as a computer system 102 and a PDA 104 that individuals can use to communicate with the inventory verification system 100. In the environment shown in FIG. 1, the user devices 102, 104 communicate with the inventory verification system 100 via one or more computer networks, such as the Internet 106. Protocols and components for communicating via the Internet are well known to those of ordinary skill in the art of computer network communications. Communication between user devices 102, 104 and the inventory verification system 100 may also be enabled by local wired or wireless computer network connections.

The inventory verification system 100 depicted in FIG. 1 operates in a distributed computing environment comprising several computer systems that are interconnected via communication links, e.g., using one or more computer networks or direct connections. However, it will be appreciated by those of ordinary skill in the art that the system 100 could equally operate in a computer system having fewer or greater number of components than are illustrated in FIG. 1. Thus, the depiction of the inventory verification system 100 in FIG. 1 should be taken as exemplary, and not limiting to the scope of the invention.

The inventory verification system 100, as illustrated, includes an inventory verification server 108, a database server 110, and a back-end interface 112. Each of the servers 108 and 110 are described below in more detail. The back-end interface 112 allows an operator of the inventory verification system 100 to monitor and adjust the operation of the servers 108 and 110 as needed.

In brief, the inventory verification server 108 is generally responsible for providing front-end user communication with various user devices, such as devices 102 and 104. The front-end communication provided by the inventory verification server 108 may include generating user interfaces comprising text and/or graphics, possibly organized as a Web page using hypertext transfer protocols, for communicating images and information about stored products to and from the various user devices 102, 104.

Figure 2:
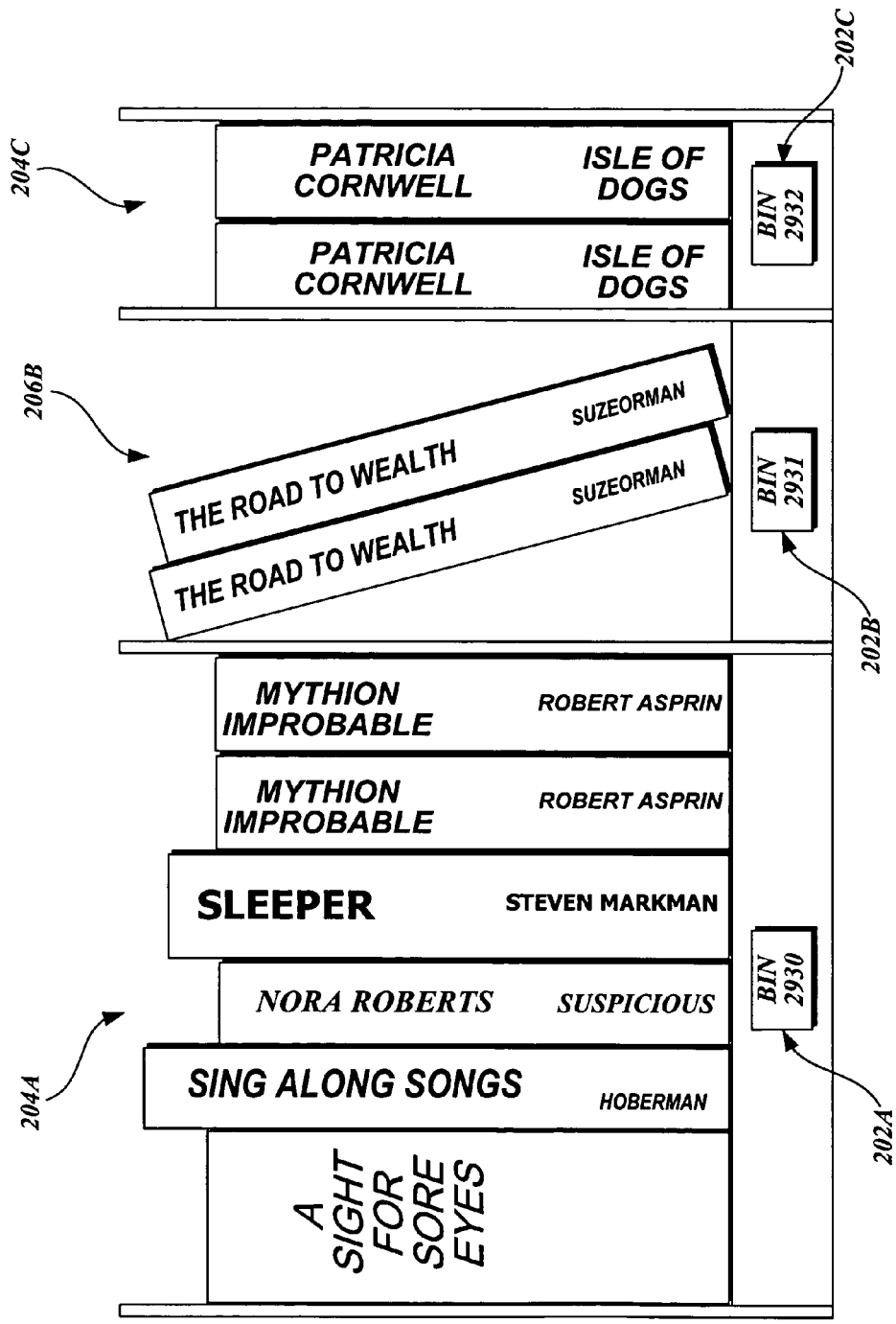
FIG. 2 is an example illustration of a photographic image of stored products.

In one suitable implementation, the inventory verification server 108 enables a user to view images of stored products and to verify that the products depicted in the images are the same as those inventoried in an inventory database stored in the database server 110. FIG. 2 is an example illustration of a photographic image of products stored in random stow bins in a warehouse. As can be seen, the image includes ten products stored in three different bins indicated by reference numerals 204A, 204B, and 204C and listed left to right as bin 2930 at reference numeral 202A, bin 2931 at reference numeral 202B, and bin 2932 at reference numeral 202C. The ten products indicated by reference numerals 202A, 202B, and 202C, reveal their product identification information in the book spines or other sides of the product packaging exposed to the camera. For example, the products include an audio book entitled A Sight for Sore Eyes by author Ruth Rendell, a children's book entitled Sing Along Songs by author Mary Ann Hoberman, as well as the books Suspicious by Nora Roberts, Sleeper by Steven Markman, two copies of *Myth-Ion Improbably* by Robert Asprin, two copies of *The Road to Wealth* by Suze Orman, and two copies of Isle of Dogs by Patricia Cornwell.

The images of the stored products may be obtained from various sources. For example, when the books are in a warehouse, such as those illustrated in FIG. 2 or in a retail store, the photographic images of the products may be periodically captured, either manually or automatically and further stored in electronic or digital format in an image database that is served to the inventory verification server 108 by database server 110. For example, manual capture may be obtained by an clerk using a hand-held camera to take a picture of a random stow bin in a warehouse or display shelf in a retail store. Automated capture might be obtained by movably mounting a camera along the aisles where the bins or shelves are located and operating the camera to automatically move up and down the aisles at periodic intervals to take pictures of the bins and shelves in that aisle. In one embodiment, the images may be obtained from a user's digital images of products stored in their home bookshelves, in which case the images may be uploaded by the user directly to the inventory verification server 110 and optionally stored in a database maintained by the database server 110.

In one embodiment, the inventory database stored in database server 110 includes information about various stored products, including (but not limited to) books, audiobooks (cassettes or CDs), music CDs, DVDs, or any other type of product that is capable of being stored in a bin, shelf, or other storage area such that the product identification information is revealed on one or more sides of the product when captured in a photographic image of the stored product, and from which a visual identification of the product may be readily made. In a preferred embodiment, the inventory information included in the inventory database may be obtained directly from the product identification revealed on the product as captured in the above-described photographic images using various text and feature recognition techniques. In one embodiment, the inventory information may be obtained by first isolating a portion of the image that represents a single product by applying various edge detection techniques to the image. The isolated portion of the image typically captures the spine of a book (or other side of the product packaging on which the product identification appears) from which the book's title, author, and publisher may be automatically recognized from a scan of the text characters revealed on the book spine. For example, with reference to the illustration in FIG. 2, the audiocassette product in the first and leftmost position in bin 2930, at reference numeral 202A, may be isolated from the rest of the products stored in that bin by applying edge detection techniques, and the product identification recognized and parsed into title, author, publisher, etc., as "Books on Tape, A Sight for Sore Eyes, Ruth Rendell, Audiobooks," by applying text recognition techniques on the isolated portion of the image.

Alternatively, or in addition, the inventory information may be manually input by a user into the inventory verification server 108 by reading and entering the information in conjunction with a display of the image of the stored product, as will be described in further detail below. Either way, the obtained inventory information may include various attributes that describe and identify the inventoried products, including (but not limited to) title, author/performer, publisher, and storage location. The inventory database may further include an index that enables the inventory verification server 108 to organize and present the inventoried products and corresponding images to a user according to one or more of these attributes.

The inventory verification server 108 further provides back-end inventory services in cooperation with the database server 110, including generating inventory transactions to update the information and attributes contained in the inventory database. The database server 110, as will be further described below, maintains the databases from which the inventory verification server 108 generates the user interfaces, including the above-described image and inventory databases.

Figure 3:
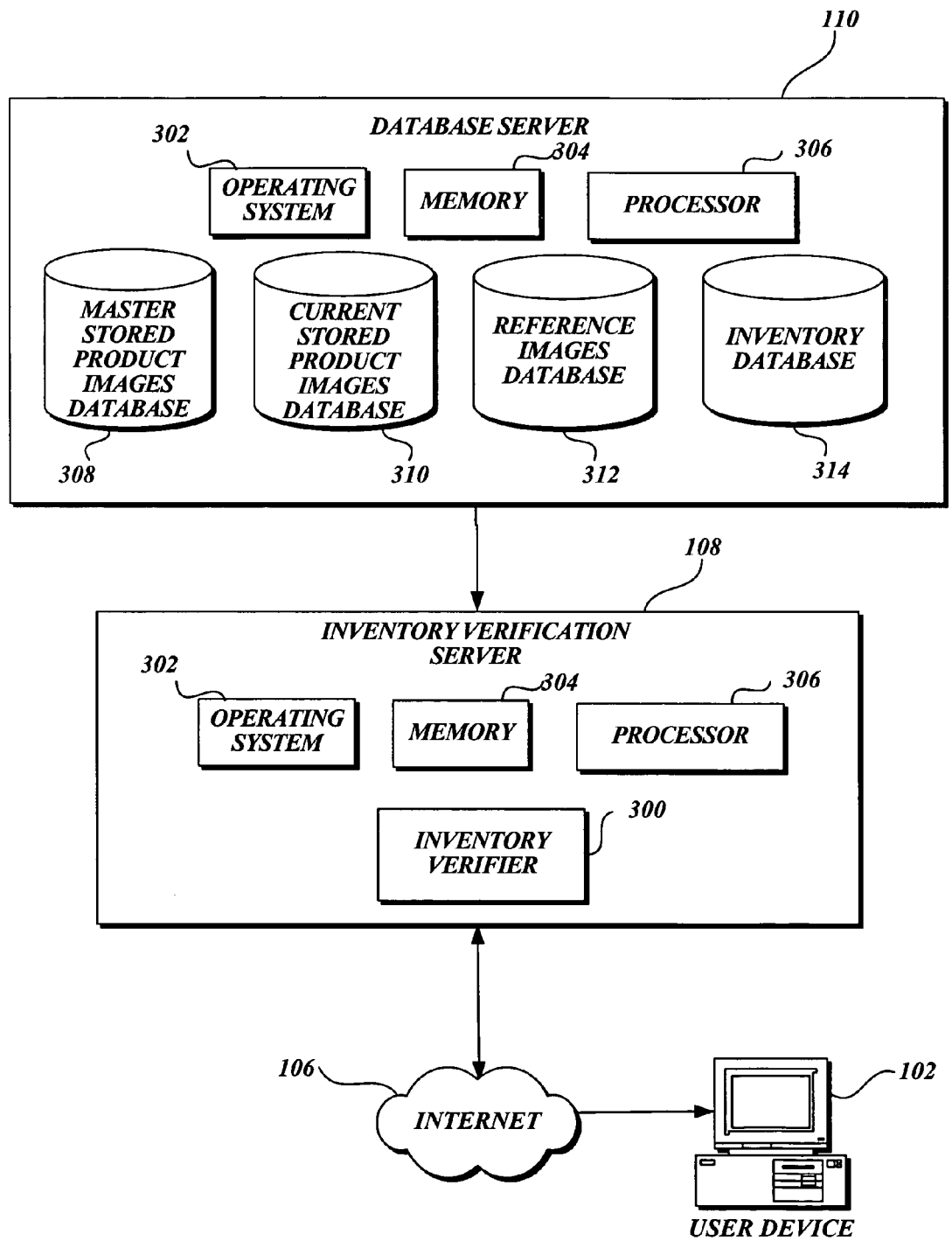
FIG. 3 is a block diagram depicting an arrangement of certain computing components for implementing the embodiment shown in FIG. 1.

FIG. 3 illustrates certain exemplary computing components that are responsible for the operation of the inventory verification system 100 shown in FIG. 1. The database server 110 includes a master stored product images database 308, a current stored product images database 310, a reference images database 312, and a searchable inventory database 314. The master stored product images database 308 contains images that capture the stored products at a certain point in time and from which the inventory information has already been verified using the services of the inventory verification server 108. The current stored product images 310 contain new images of some or all of the same locations captured in the master images 308, but at a later time.

The reference images database 312 contains images of particular products that were provided especially for the purpose of facilitating the recognition of the stored reference images database 312 may also contain the isolated portions of images originally captured and stored in the current and master image databases, and from which images products were accurately recognized, i.e., previous images (or isolated portions of images) that were of sufficient quality to enable an accurate or nearly accurate recognition of the product. In either case, the reference images database 312 also contains the product identification information that accurately identifies the product captured in the reference image. The reference images are used to complement the recognition of stored products when the images of the products are not of sufficient quality to recognize the products that they depict.

Lastly, the inventory database 314 contains the product identification and storage location information that make up the stored product inventory, whether that inventory is of products stored in a warehouse, retail establishment, or stored in other settings, such as in a user's home.

In one embodiment, the database server 110 is configured to receive instructions from the inventory verification server 108 and return images from the various image databases 308, 310, and 312, as well as information from the inventory database 314. The images and inventory information enable the verification server 108 to display to the user in an integrated manner the presence, location, and identification of stored products for purposes of taking and verifying an inventory of those products as well as for other purposes, such as determining whether a product is in inventory and where it is located. For example, inventory verification server 108 may display to an inventory control clerk the current and previous images of products stored in random stow bins in a warehouse, along with corresponding information from the inventory database 314. The inventory verification server 108 may further receive from the clerk an input verifying the accuracy of the corresponding inventory information as compared to the information apparent from his or her inspection of the displayed images. In the context of a user's home library, the inventory verification server 108 may display to the user an image of his or her bookshelf superimposed with a graphic that points to the location of a product that is already present in their home library. Since the latest available image of the product may be out-of-date, the graphic may point to the location where the product was last captured. Likewise, in a retail context, the inventory verification server 108 may display to a consumer images of products as they are currently stored (or as they were stored) on the retailer's bookshelves.

In the illustrated embodiment, the verification server 108 and database server 110 are shown including an operating system 302 that provides executable program instructions for the general administration and operation of the servers 108, 110. Suitable implementations for the operating system 302 are known or commercially available, and are readily implemented by persons having ordinary skill in the art, particularly in light of the disclosure herein. Those of ordinary skill in the art will recognize that the verification server 108 and database server 110 will also typically employ a memory 304 and processor 306 in which program instructions are stored and executed for operation of the servers. The verification server 108 further includes computer program instructions for implementing an inventory verifier 300 that operates in cooperation with the database server 110 to take and verify an inventory of stored products. Likewise, the database server 110 further includes executable program instructions for maintaining and updating the databases 308, 310, 312, and 314, and responding to requests received from the verification server 108.

For the sake of convenience, much of the description herein is provided in the context of taking and verifying an inventory of books in a warehouse, but it should be well understood that the description herein is also applicable to taking and verifying an inventory of other stored products in other settings, such as an inventory of CD and DVD products stored on bookshelves in a user's home. References herein to specific types of products, such as books, audiobooks, etc., are only illustrative and do not serve to limit the general application of the invention.

Figure 4:
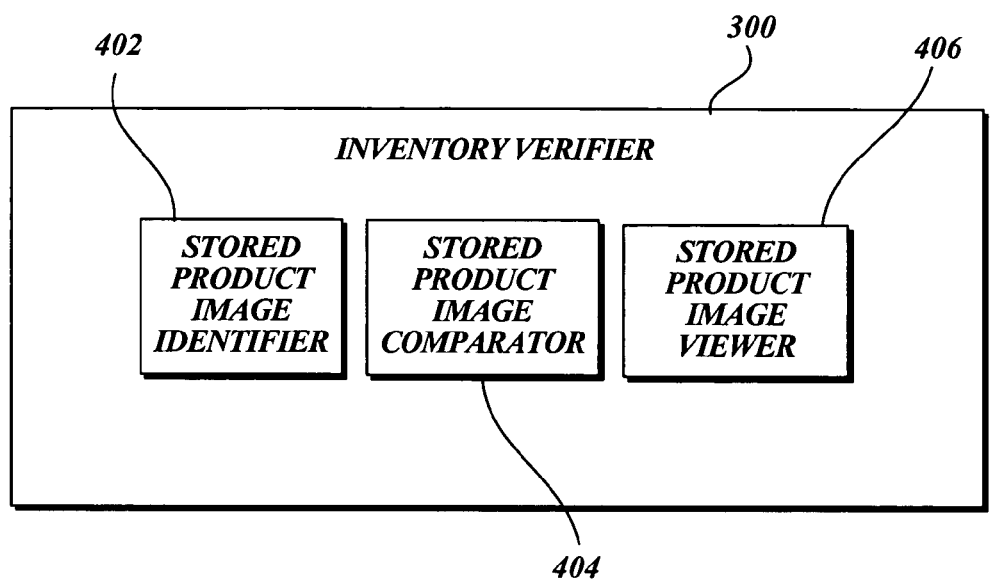
FIG. 4 is a block diagram depicting an arrangement of certain additional computing components for implementing the embodiment shown in FIGS. 1 and 3.

FIG. 4 is a block diagram depicting an arrangement of certain additional exemplary computing components for implementing an inventory verifier process 300, as shown and described in the illustrated embodiment with reference to FIGS. 1 and 3. The inventory verifier process 300 includes, among others, a process for a stored product image identifier 402. In one embodiment, the inventory verification system 100 includes an image identifier process 402 that is responsible for identifying the products depicted in the images received by the system using text or other optical character and feature recognition techniques as are known in the art.

The image identifier process 402 is further responsible for identifying the products depicted in the images, whether those products are stored substantially horizontally, vertically, or tilted one way or the other, as long as the image captures sufficient text and other features that enable the process to identify the product. Identification is achieved through the heuristic application of one or more recognition techniques to the image in an effort to resolve ambiguities and improve the reliability of the recognition without having to resort to manual efforts to determine what products are stored on a particular shelf or location.

The recognition techniques that may be employed include various forms of character recognition or feature recognition that are known in the art. For example, since more than one product may be stored in a location, in one embodiment the image identifier process 402 may employ an edge detection technique, to first isolate a portion of the photographic image before attempting to recognize the product identification, where the isolated portion of the image is of a single product stored in the location. As another example, since the products may be stored in the location in different orientations, the image identifier process 402 may rotate the image before applying the various recognition techniques. In yet another example, the image identifier process 402 may scale the image into a larger or smaller format before applying the various recognition techniques.

In one embodiment, the recognition techniques employed by the identifier process 402 may include reliance on reference images when the captured photographic images of the stored products are not sufficiently detailed or do not otherwise provide enough information for the process to accurately recognize the product information. For example, the identifier process 402 may overlay and compare the reference and captured images to determine whether there is a match. Whether there is a match may be determined through the application of known fuzzy matching techniques, or other types of similarity algorithms that use, among others, differences in brightness and color to determine whether the similarity between the images meet a threshold of reliability. In one embodiment, the reference images may be images obtained especially for the purpose of facilitating product identification, or, in some cases, may be obtained incidentally from photographic images that previously captured the product in question during previous iterations of the inventory verification system 100.

The image identifier process 402 is further responsible for displaying images to a user and prompting the user to inspect the image and manually input additional identifying information where the recognition of the product is ambiguous or inadequate to fully identify the product for purposes of taking and verifying an inventory in accordance with an embodiment of the present invention. In one embodiment, the user may be prompted to select the additional identifying information from a limited list of possible choices as determined by the identifier process 402.

The inventory verifier process 300 includes, among others, a process for a stored product image comparator 404. In one embodiment, the inventory verification system 100 includes an image comparator process 404 that is responsible for comparing current images with previous images of products stored in a certain location. When the comparator process 404 detects any changes, e.g., when books have been added or removed to the storage location, the process is responsible for flagging the location to the inventory verification system 100 so that a human user can inspect, input, and/or verify any changes to the inventory represented by the changes in the images.

The inventory verifier process 300 includes, among others, a process for a stored product image viewer 406. In one embodiment, the inventory verification system 100 includes an image viewer process 406 that is responsible for generating and displaying a view of certain photographic images of stored products to a user in response to a request from a user to view, verify, change, or otherwise use the inventory information derived from the images.

FIGS. 5-7 and 9-10 illustrate a browser program 500 displaying Web pages in which a user is able to use the inventory verifier process to view images and verify and/or input information representing an inventory of stored products in accordance with an embodiment of the present invention. The Web pages may be generated by the inventory verification server 108 and delivered to the user's computing device 102, 104 via the Internet 106.

Figure 5:
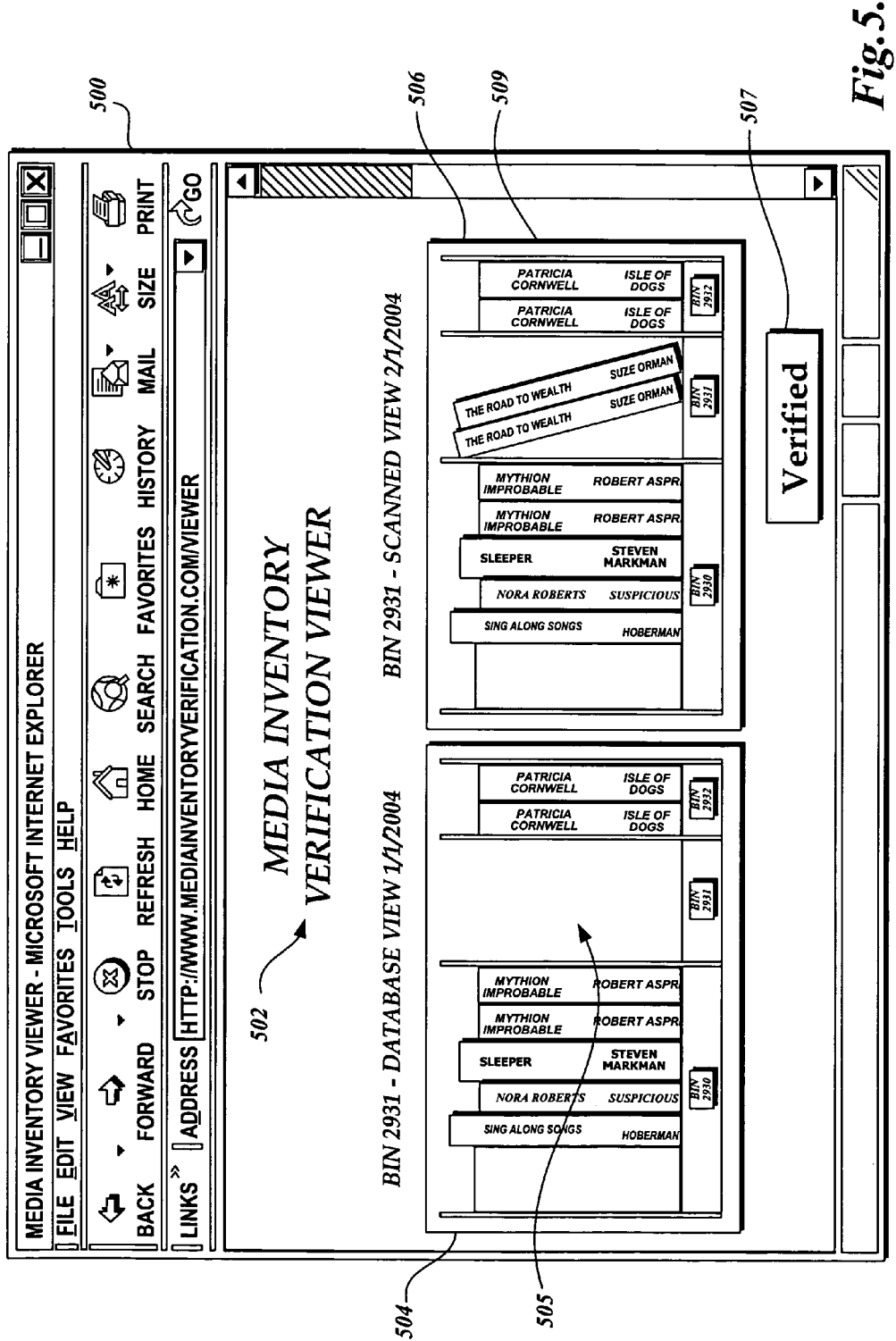
FIG. 5 depicts a browser program with an example Web page presenting a inventory verification viewer interface to a user in accordance with an embodiment of the invention.

In the illustrated example in FIG. 5, browser program 500 generates a inventory verification viewer page 502 that includes two images of random stow bin numbers 2930-2932, the first image 504 being an image obtained from the master stored product images database 308 and captured, as indicated, on Jan. 1, 2004. The second image 506 is an image of the same bin numbers 2930-2932, and is obtained from the current stored product images database 310 and captured, as indicated, on Feb. 1, 2004. The viewer page 502 calls out the middle bin 2931 along with the respective dates of each image, because the inventory verification system 100 detected that there was a change in the bin during the time between the date of the first image capture and the date of the second image capture. As illustrated, the bin 2931 is empty on Jan. 1, 2004, as called out by reference numeral 505, but contains two copies of a book entitled *The Road to Wealth* by author Suze Orman, as called out by reference numeral 509. In operation, the inventory verification server 108 will generate a transaction to update the inventory database 314 to reflect the addition of the two books to the inventory at bin number 2930. An inventory clerk viewing the verification page 502 can inspect the images and indicate that the inventory information generated in the update transaction has been verified as accurate by clicking on command button Verified 507. Upon receiving the input verification, the inventory verifier process 300 causes the inventory changes represented in the generated transaction to be applied against the inventory database 314 and accepted as verified changes. The inventory verifier process 300 also causes the current image 506 to replace the previous image 504 in the master stored product images database 308 in preparation for the next inventory cycle.

Figure 6:
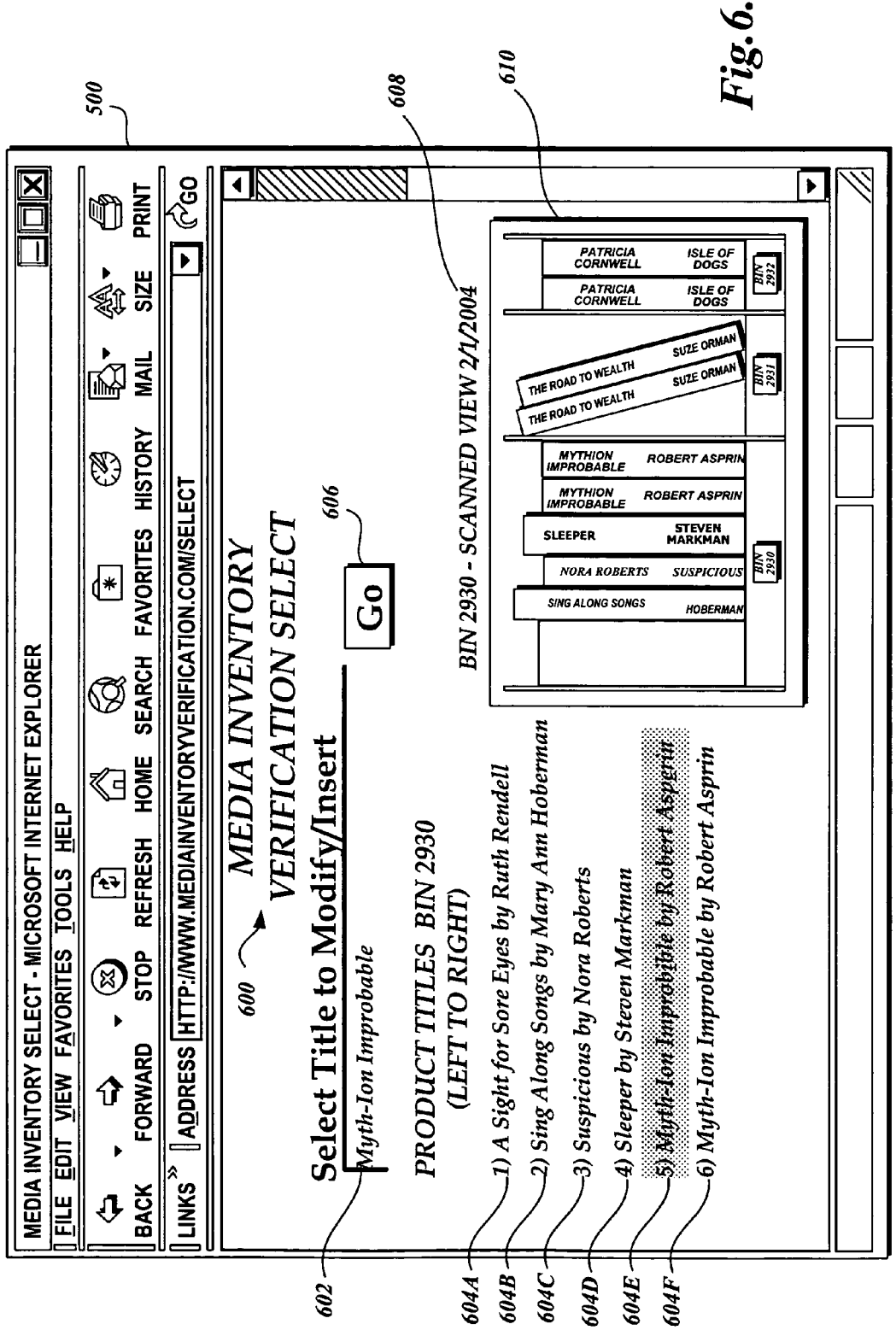
FIG. 6 depicts a browser program with an example Web page presenting a inventory verification product selection interface to a user in accordance with an embodiment of the invention.

In the illustrated example in FIG. 6, browser program 500 generates a inventory verification selection page 600 that includes a current image of random stow bin numbers 2930-2932, as obtained from the current stored product images database 310 and captured, as indicated, on Feb. 1, 2004. The selection page 600 calls out the leftmost bin 2930 at reference numeral 608 and displays the image 610 alongside product identification information that has been derived from the image, including books stored substantially vertically and identified by identifier process 402, from left to right, as A Sight for Sore Eyes, by Ruth Rendell at 604A, *Sing Along Songs*, by Mary Ann Hoberman at 604B, *Suspicious*, by Nora Roberts at 604C, Sleeper, by Steven Markman at 604D, and two copies of *Myth-Ion Improbable*, by Robert Asprin at 604E, 604F. A text input area 602 may be provided for a user to enter information to update or review the displayed information along with a command button 606 labeled "GO." In the illustrated example, the user has selected the fifth product title at reference numeral 604E. Upon receipt of the user's selection, the stored product image viewer 406 generates a detailed verification input web page as illustrated in FIG. 7.

Figure 7:
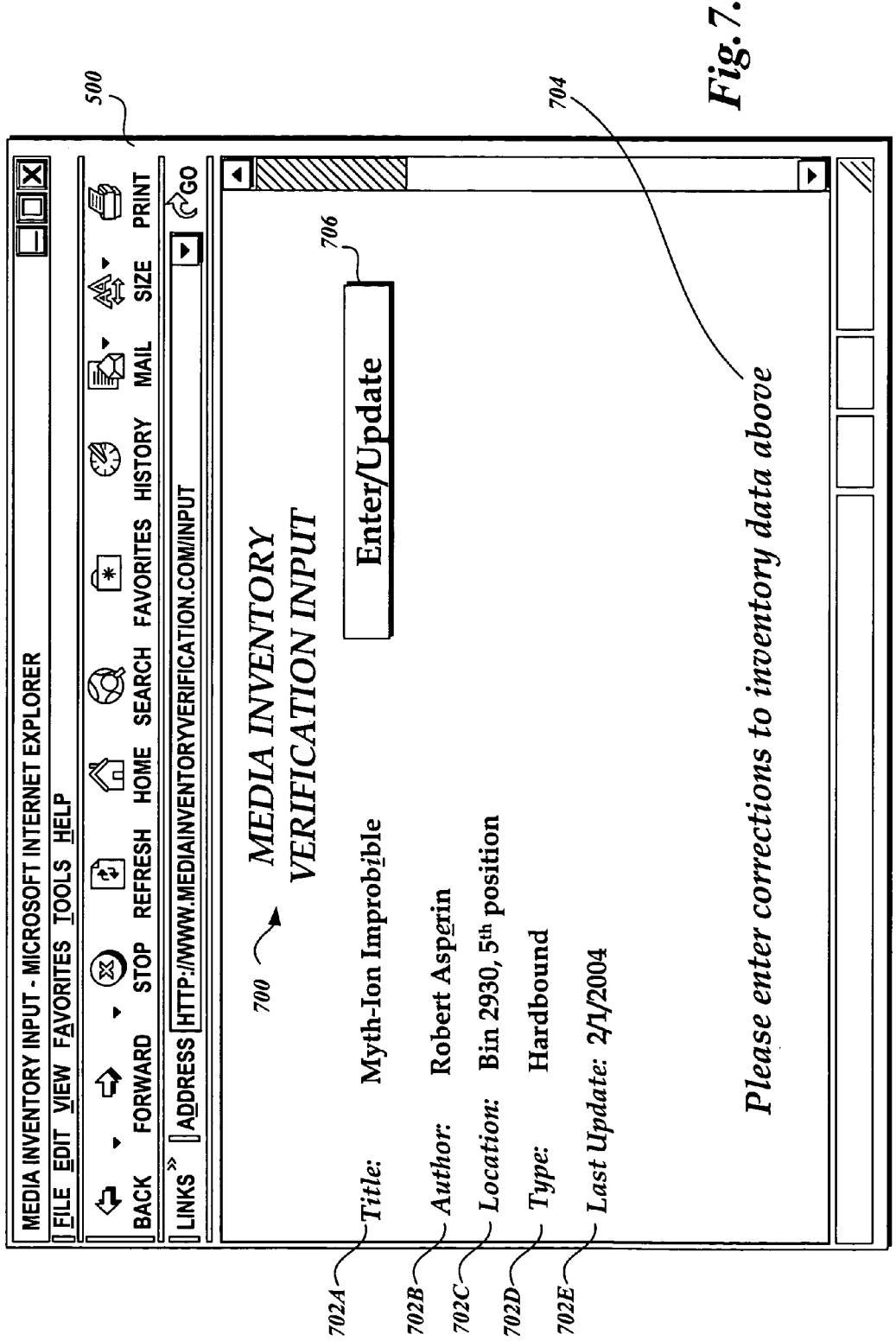
FIG. 7 depicts a browser program with an example Web page presenting a inventory verification product input/update interface to a user in accordance with an embodiment of the invention.

As shown with reference to FIG. 7, browser program 500 generates a inventory verification input page 700 that includes detailed inventory information as automatically recognized from the image in which the product was captured (and/or as input by a user after discerning the inventory information from a visual inspection of a display of the image) and generated in an inventory transaction and/or as stored in the inventory database 314. In the illustrated example, the detailed information includes a title 702A, the author 702B, the storage location 702C, the product type 702D, and a last update date 702E. Of course, other types of detailed information may be stored and displayed in the inventory verification system without departing from the scope of the claims that follow. In addition, the verification input page 700 further includes an enter/update command button 706 that, when activated, will cause the corresponding detailed information on the inventory database to be updated with the input information 702. The verification input page 700 may further include a user instruction 704 to enter corrections to the inventory data. In the illustrated example, the user is prompted to enter corrections to the title to change the misspelled portion of the title Improbible to Improbable and misspelled last name of the author "Asperin" to "Asprin."

Figure 8A:
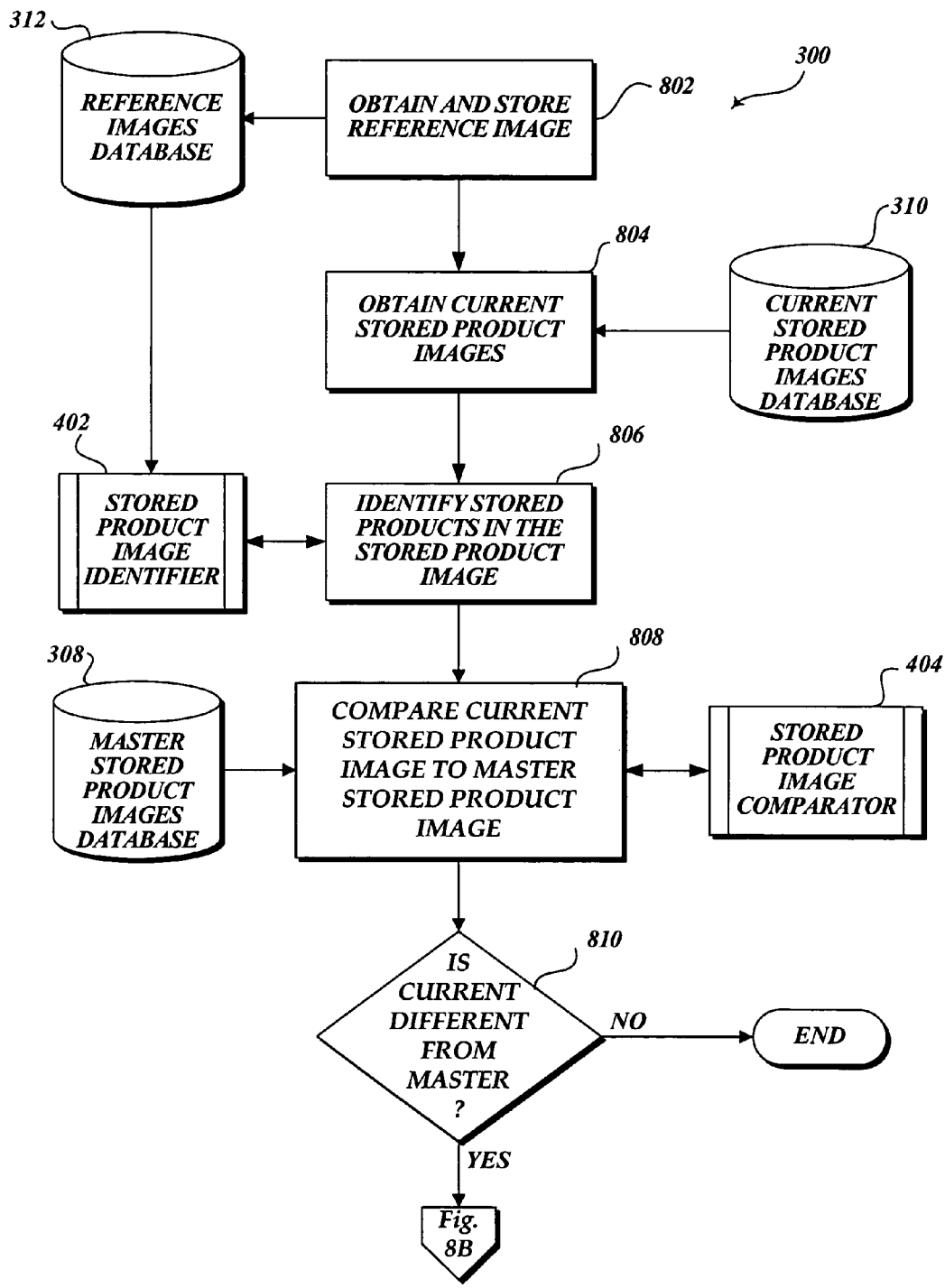
FIGS. 8A-8B are flow diagrams describing one embodiment of a process that enables an automated inventory verification system.
Figure 8B:
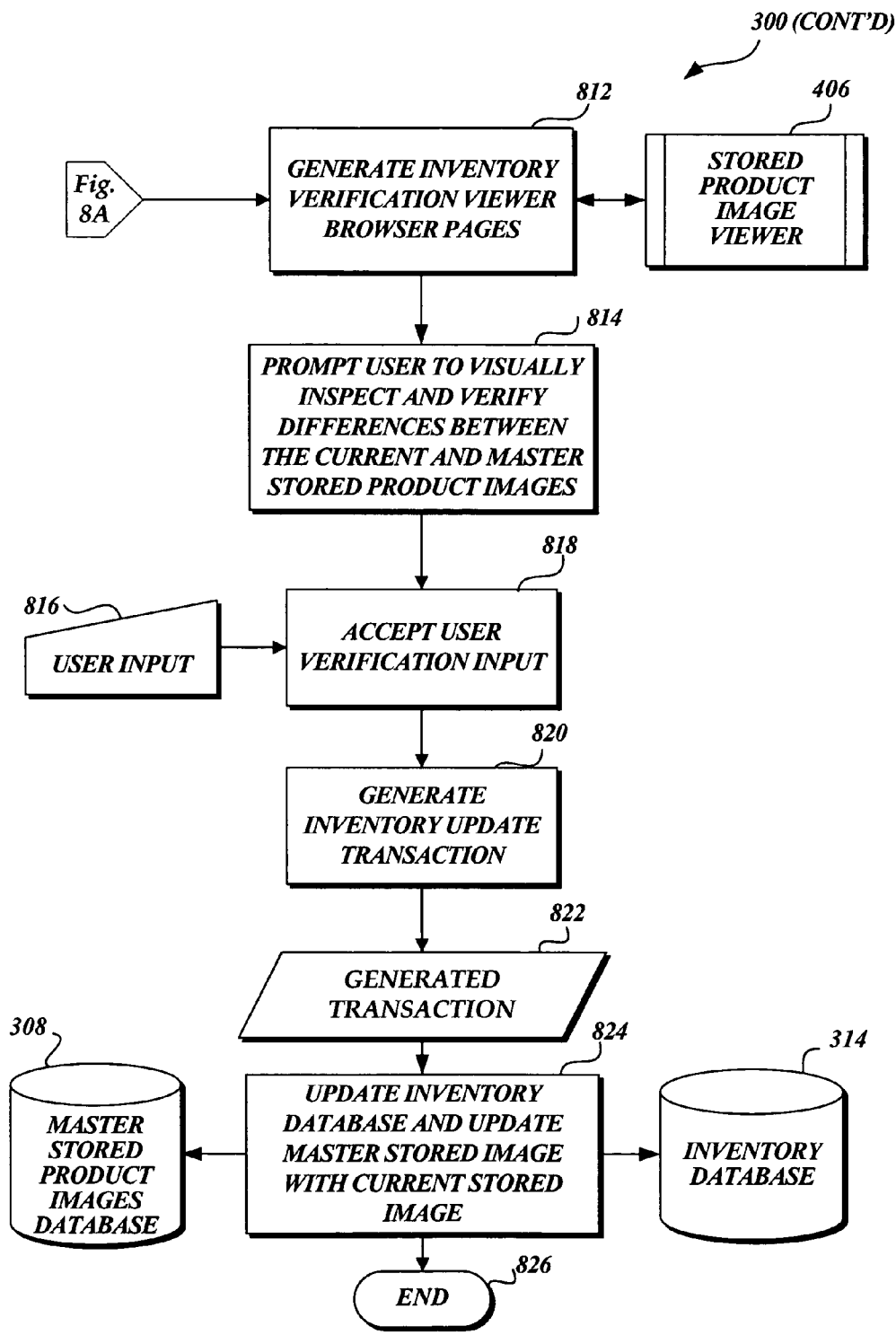

FIGS. 8A-8B are flow diagrams describing one embodiment of an inventory verifier process 300 that enables an implementation of an automated inventory verification system 100, as illustrated in FIG. 1 and FIGS. 3-7. Beginning with reference to FIG. 8A, in one embodiment, at process block 802, the inventory verifier process 300 optionally obtains and stores a reference image for a product for which an inventory is to be maintained. The reference image is stored in reference images database 312, and is preferably an accurate representation of product identification information as it appears on a side of a product as it might be captured in a photographic image of the product when stored.

For example, when maintaining an inventory of books, the inventory verifier process 300 may obtain high quality images of book dust covers, or at least the spine of the books (or dust covers), that will serve as reference images when attempting to recognize product information revealed on book spines, as captured in photographic images of books stored in a random stow bin in a warehouse (or, as in another example, books stored in a home user's bookshelf). The reference images may be supplied from publishers or retailers that take high quality images of the books especially for that purpose. In some cases, the reference images may be obtained during the process of unboxing the products and stowing the products in the storage locations for the first time. In that case, an inventory clerk might be prompted to obtain a reference image of a product for which no reference image is yet available by taking a photograph of the image. To minimize the number of reference images obtained in this manner, in one embodiment the inventory verification system 100 may automatically detect the availability of a reference image for a particular product in response to an inquiry initiated by the clerk.

Alternatively, or in addition, the reference images may be obtained during the operation of the inventory verification system 100—for example, after an accurate recognition of a particular product that was captured in a photographic image of reasonably good quality. As will be described in further detail below, the reference images may be used by the stored product image identifier process 402 to recognize the product identification information revealed in a photographic image of a stored product.

In one embodiment, the inventory verifier process 300 continues at process block 804 to obtain a current stored product image from the current stored product images database 310. The current stored product images are the newest available photographic images captured of stored products. Processing continues at processing block 806 to identify the stored products depicted in the current stored product image. In one embodiment, a stored product image identifier process 402 identifies the stored products in the current stored product image by employing text or other character or feature recognition techniques to parse out the title, author, publisher, or other product identification information revealed in the portion of the product or product packaging exposed in the image, such as the book spine. In one embodiment, prior to attempting to identify the stored products in the current store product image, the image identifier process 402 first uses edge detection or other similar pattern recognition techniques known in the art to isolate a portion of the current image, where the isolated portion is of a single one of the products depicted in the image. The image identifier process 402 then applies the text or other character or feature recognition techniques to just the isolated portion of the image to parse out the title, author, etc. The isolation and identification processes are reiterated until all of the products depicted in the image have been identified.

In one embodiment, the stored product image identifier process 402 may employ a reference image obtained from the reference images database 312 to supplement the recognition of the product in the current image when the current image (or isolated portion of the image) is lacking sufficient detail to fully identify the product. In that regard, if words or patterns of color, shapes, or intensity from a known reference image sufficiently match the words or patterns found in the current image of the product, the product may be identified as that which appears in the reference image. In that case, the stored product image identifier process 402 may use the known product identification information associated with the product appearing in the reference image. Alternatively, or in addition, the stored product image identifier process 402 may display the current stored product image to the user and prompt him or her to visually inspect the image and manually input missing information or correct misidentified, ambiguous, or otherwise inaccurate product identification information.

In one embodiment, processing continues at processing block 808, where the stored product image comparator process 404 compares the current stored product image to the master stored product image as obtained from the master stored product images database 308. At decision block 810, when the comparator process 404 determines that the current image is different from the master image, processing continues with reference to FIG. 8B, described in further detail below. Otherwise, if no change is detected, the inventory verifier process 300 terminates, since presumably there has been no change in the inventory information since the last time the inventory was taken and verified.

Continuing with reference to FIG. 8B, when a change between the current and master images has been detected, processing continues at process block 812, where the stored product image viewer process 406 generates inventory verification Web pages, such as that previously described with reference to FIGS. 5-7. In one embodiment, as an alternative to or in addition to recognizing the product information, at process block 814 the image viewer process 406 displays the photographic image of the product to the user in such a Web page, and prompts the user to visually inspect the photographic image, discern the identity of the product or products, and manually input the product identification information as necessary, such as when the automatic recognition techniques fail (for whatever reason) to provide a satisfactory identification, or provide only an incomplete, inaccurate, ambiguous, misspelled, or otherwise problematic identification. In one embodiment, the user is prompted with a list of possible choices for the product identification information where the automatic recognition techniques were able to narrow the selection to a limited number of choices, or in some cases, based on likely choices as determined from the user's existing product inventory and/or their product purchase history.

In one embodiment, at process block 818, the inventory verifier process 300 accepts the user input 816, and further continues at process block 820 to generate a corresponding inventory update transaction 822 that represents the changes to the inventory between the time that the master image was taken and the time that the current image was taken. At process block 824, the verifier process 300 continues, updating the inventory database 314 with the generated transaction, as well as updating the master stored product image database 308 with the current stored product image for those locations where changes were detected. After updating the databases, processing for the inventory verifier process 300 terminates at termination oval 826 until the next inventory cycle, whereupon the process 300 is repeated, beginning with process block 802 in FIG. 8A.

In one embodiment, at process block 818, the inventory verifier process 300 compares the differences to the inventory currently reflected in the inventory database 314 in an effort to identify possibly misplaced products, i.e., those products that are still present in inventory but whose locations do not match the location captured in the current image.

It will be appreciated that describing the verifier process 300 by reference to the flow diagrams in FIGS. 8A-8B enables one skilled in the art to develop computer-executable instructions to carry out the process on suitably configured computers. The flow diagrams do not, however, constrain the execution of such instructions to carry out the process in any particular order, nor do they require that every aspect of the verifier process 300 described therein be carried out in every embodiment. For example, with reference to FIG. 8A, some portions of the process, such as the process of obtaining and storing a reference image, described at process block 802, and/or the process of using various pattern recognition techniques to isolate portions of an image, where the portion is of a single product, and various other text, character, or other feature recognition techniques to identify the stored product, described at process block 806, may not be implemented in every embodiment, or may be implemented in a different order than described. In one embodiment, the inventory verification system 100 uses the images of the stored products only to determine whether there are differences in the inventory, as can be determined and verified by flagging changed images and displaying those changed images to an inventory control clerk for manual verification and identification of the stored products depicted in the images.

It will be further appreciated that the computer-executable instructions to carry out the process described in FIGS. 8A-8B may be written in a computer programming language or may be embodied in firmware logic. If written in a programming language conforming to a recognized standard, such instructions can be executed on a variety of hardware platforms and for interface to a variety of operating systems. However, the embodiment of the present invention is not described with reference to any particular programming language, and it will be appreciated that a variety of programming languages may be used to implement the teachings of the invention as described. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or a produce a result.

Figure 9:
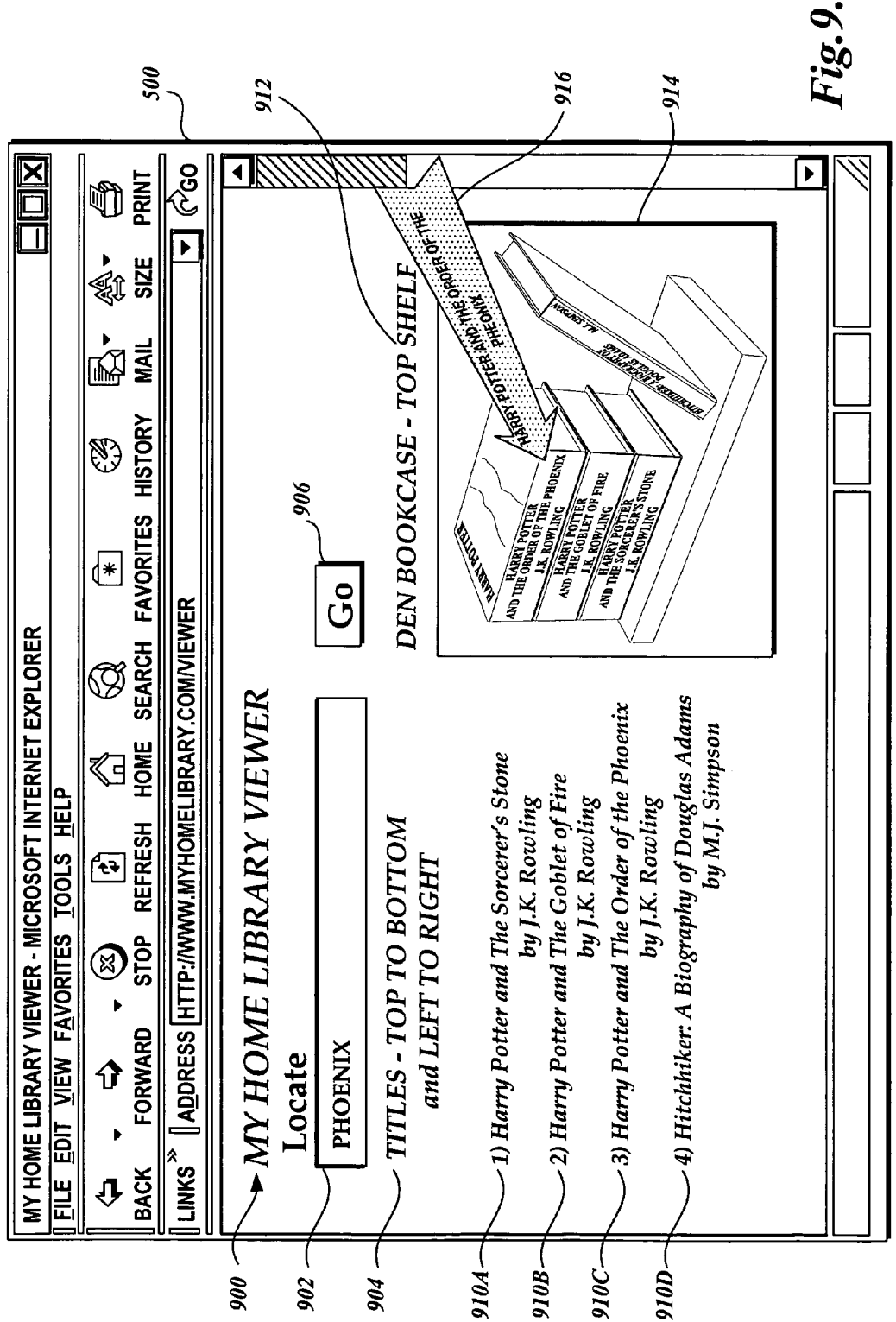
FIG. 9 depicts a browser program with an example Web page presenting a home library viewer interface to a user in accordance with an embodiment of the invention.

In the illustrated example in FIG. 9, browser program 500 generates a home library viewer page 900, e.g., "MY HOME LIBRARY VIEWER," that includes a current image of a user's home library bookshelf, as obtained from a digital image of the bookshelf captured and uploaded via the Internet by the user from his or her home. The home library viewer page 900 calls out the user's den bookcase at reference numeral 912 and displays the image 914 of the bookshelf alongside product identification information that the image identifier process 402 has identified from a text or other feature recognition analysis of the image (and/or of a corresponding reference image of the products depicted in the image 914), and/or supplied by the user, namely the titles 904 and their authors, including, from top to bottom, the substantially horizontally disposed *Harry Potter and The Order of the Phoenix*, by J. K. Rowling, *Harry Potter and The Goblet of Fire*, by J. K. Rowling, *Harry Potter and The Sorcerer's Stone*, by J. K. Rowling, and further including the substantially vertically disposed, *Hitchhiker: A Biography of Douglas Adams*, by M. J. Simpson.

In one embodiment, the identified products are stored in a home library version of the inventory database 314 for the user on the database server 110 (or, in some cases, the inventory may be stored locally on the user device 102, 104). In one embodiment, a text input area 902 may be provided along with a command button 906 labeled "GO," for a user to enter information to locate, update and/or review a particular product in his home inventory of products. In the illustrated example, the user has entered the term "phoenix" to locate the topmost of the Harry Potter books, *The Order of the Phoenix*. Upon receipt of the user's input, inventory verifier 300 locates the book in the user's home library inventory and the stored product image viewer process 406 displays not only the image 914 of the top shelf of the den bookcase where the book is shelved (which the user previously provided), but also a graphic, such as the illustrated arrow at reference numeral 916, superimposed on top of the image 914 to highlight the product in question or otherwise direct the user's attention to the exact location in the den bookshelf (or at least the exact location in the image of the bookshelf) where the book is located, as well as the product identification information 910A-D for the located book as well as the other books on the shelf.

In one embodiment, the exemplary home library inventory implementation of the inventory verification system 100 illustrated in FIG. 9 may be advantageously operated by a retailer as a service to encourage prospective customers to communicate to the retailer which books the customer already owns. In turn, the retailer may use the contents of the user's home library to recommend additional titles that the customer may wish to purchase to complete their library or provide other customer services, such as suggesting ways of categorizing and grouping the books on their home bookshelves.

Figure 10:
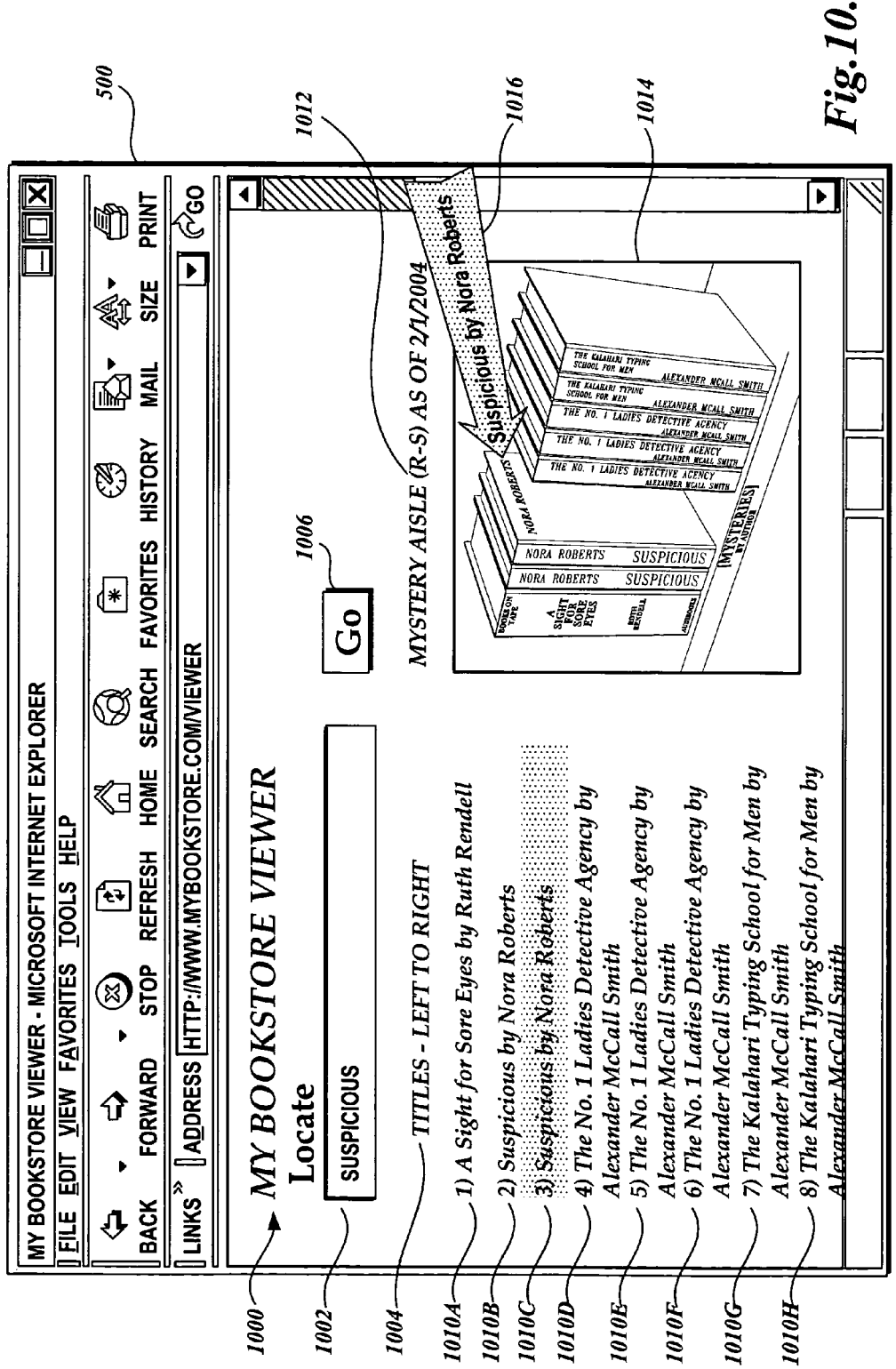
FIG. 10 depicts a browser program with an example Web page presenting a retail bookstore viewer interface to a user in accordance with an embodiment of the invention.

In the illustrated example in FIG. 10, browser program 500 generates a retailer viewer page 1000, e.g. "MY BOOKSTORE VIEWER," that includes a current image of a retailer's products as they are displayed in the retailer's store. In the illustrated example in FIG. 10, the image provided is of a bookseller's products, e.g., books and audiobooks, stored by category and author's last name, on retail shelves arranged in aisles. The images may be actual images of a retailer's display shelves in a traditional bricks and mortar store or, in other implementations, may be virtual images of an online bookseller's "display shelves" in an online store. Either way, the retailer viewer page 1000 calls out particular aisles or shelves in the store at reference numeral 1012, beneath which is displayed a corresponding current image 1014 of that storage location depicting the current selection of books available for purchase. In the illustrated example, the image is of a bookshelf in the mystery aisle of the bookstore where the bookshelf contains mysteries arranged by the author's last name. In this image, stored products with authors last names beginning with "R-S" are captured as they appeared in the store on Feb. 1, 2004. The image 1014 of the bookshelf is displayed alongside product identification information that the image identifier process 402 has identified from a text or other feature recognition analysis of the image (and/or of a corresponding reference image of the products depicted in the image 1014), and/or supplied by a user, namely the titles 1004 of the books and their authors, including, from left to right, the substantially vertically disposed audio book version of *A Sight for Sore Eyes*, by Ruth Rendell, two copies of *Suspicious*, by Nora Roberts, followed by an empty space, and some additional titles of an author whose last name begins with "S," including three copies of *The No. 1 Ladies Detective Agency*, and two copies of *The Kalahari Typing School for Men*, all of which are authored by Alexander McCall Smith.

In one embodiment, the product identification information about the identified products is stored in a retailer version of the inventory database 314 in database server 110. In one embodiment, a text input area 1002 may be provided along with a command button 1006 labeled "GO," for a prospective customer to enter information to locate a particular product on the retailer's bookshelves. In the illustrated example, the customer has entered the term "suspicious" to locate the Nora Roberts mystery by that title, two copies of which are shown in image 1014 as located in the mystery aisle in the section for authors whose last names begin with "R" through "S." Upon receipt of the customer's input, inventory verifier 300 locates the product in the retailer's inventory of their display shelves, and the stored product image viewer process 406 displays an image 1014 of the shelf in the mystery aisle where the product is shelved. In one embodiment, the inventory verifier 300 also displays a graphic, such as the illustrated arrow at reference numeral 1016, superimposed on top of the image 1014 to highlight the product in question or otherwise direct the customer's attention to the exact location of the product in the mystery bookshelf (or at least the exact location in the image of the mystery bookshelf), as well as the product identification information 1010A-H for the located product, as well as the other products on the shelf.

In one embodiment, the exemplary retailer implementation of the inventory verification system 100 illustrated in FIG. 10 may be advantageously operated by a retailer as a service to encourage prospective customers to browse their bookshelves and not just to locate products that they already have in mind. For example, in the above illustration, a customer looking for the book by Nora Roberts might browse the displayed image 1014 of the bookshelf in the mystery aisle and notice the other nearby books or other products by the author Alexander McCall Smith. This might prompt the customer to purchase the nearby books or products, or at least prompt the customer to further browse images of bookshelves in the mystery aisle for other books or products by that author or in that section of the retail store. Alternately, or in addition, the browser program 500 may generate a retailer viewer page 1000 having additional browsing controls (not shown) that allow the user to manipulate the current image 1014 to display current images of stored products in other locations, such as images of products stored on adjacent shelves or even on shelves in other aisles or sections of the bookstore, to simulate moving to the left, right, up, or down, as the user wishes. In this way, some of the advantages of a typical browsing experience in a brick and mortar store may be integrated with the convenience of shopping in an online store.

While preferred embodiments of the invention have been illustrated and described above, it will be appreciated that various changes can be made therein without departing from scope of the claims that follow. For example, although the described embodiments refer primarily to implementations of the invention in the context of maintaining and verifying an inventory of media products, other implementations in the context of maintaining and verifying an inventory of other The embodiments of the invention in which an exclusive property or privilege is claimed are defined as follows:

1. A computer-accessible medium having instructions for managing an inventory of stored products, the instructions, when executed by a computing apparatus, causing the computing apparatus to:
   obtain a current image of a location in which products are stored;
   compare the current image to a previously obtained image of the same location at an earlier point in time;
   display both images to a user when the comparison reveals differences that indicate an apparent addition or removal of products from the location;
   prompt the user to inspect the displayed images and to confirm whether the apparent addition or removal of products from the location is consistent with an inventory of the products depicted in the current image; and
   receive an input from the user to resolve the apparent addition or removal of products from the location that is not consistent with the inventory of the products depicted in the current image.

2. The computer-accessible medium of claim 1, wherein the instructions further cause the computing apparatus to obtain the inventory of the products depicted in the current image.

3. The computer-accessible medium of claim 2, wherein the instructions further cause the computing apparatus to scan the current image for obtaining product and location information, wherein the product and location information respectively indicate an identification of the products depicted in the image and where they are stored.

4. The computer-accessible medium of claim 3, wherein the product information comprises at least one attribute appearing in the current image, where the attribute aids in the identification of at least one of the products depicted in the image.

5. The computer-accessible medium of claim 4, wherein the attribute comprises text describing at least one of an author, performer, title, and publisher of at least one of the products in the image.

6. The computer-accessible medium of claim 4, wherein the attribute comprises a graphic indicating a distinguishing feature of at least one of the products in the image.

7. The computer-accessible medium of claim 4, wherein the attribute comprises a physical characteristic indicating a distinguishing feature of the product.

8. The computer-accessible medium of claim 3, wherein the location information comprises at least one of a bin identifier of a random stow bin in a warehouse, an aisle identifier, a shelf identifier, a product category identifier, and a room identifier.

9. The computer-accessible medium of claim 1, where the obtained image of products as they appear in a location in which they are stored is a digital image of the location at a point in time.

10. The computer-accessible medium of claim 1, wherein the products include at least one of a book, an audiobook, an audiocassette, a videocassette, a CD, and a DVD.

11. The computer-accessible medium of claim 1, wherein the products as they appear in the location in which they are stored include at least one product that appears substantially horizontal.

12. The computer-accessible medium of claim 1, wherein the products as they appear in the location in which they are stored include at least one product that appears substantially vertical.

13. The computer-accessible medium of claim 1, wherein the products as they appear in the location in which they are stored include at least one product that appears substantially inclined.

14. The computer-accessible medium of claim 1, wherein the current image was captured in a photograph of a storage unit in which the products are stored.

15. The computer-accessible medium of claim 14, wherein the current image is a digital image.

16. The computer-accessible medium of claim 14, wherein the storage unit is a bookshelf in a user's home, and the photograph of the bookshelf was captured by the user periodically taking photographs of products stored in his bookshelf.

* * * * *